COMMUNICATION SYSTEMS

Filed May 19, 1958 2 Sheets-Sheet 1

INVENTOR.
MYRON L. ANTHONY
BY Thomas E. Dorn
ATT'Y.

COMMUNICATION SYSTEMS

INVENTOR.
MYRON L. ANTHONY
BY Thomas E. Dorn
ATT'Y.

United States Patent Office 2,998,482

Patented Aug. 29, 1961

2,998,482

COMMUNICATION SYSTEMS

Myron L. Anthony, La Grange, Ill., assignor to Peter G. S. Mero, Chicago, Ill.

Filed May 19, 1958, Ser. No. 736,317
10 Claims. (Cl. 178—18)

This invention relates to a new and improved control apparatus for an intelligence communication system and more particularly to a system for controlling movement of a recording stylus into and out of recording position with respect to a given recording medium.

In some intelligence communication systems, data in the form of handwriting, sketches, or the like is recorded in written form at a transmitter station and is simultaneously recorded in essentially the same form at a receiver station located at a remote position with respect to the transmitter. In communication apparatus of this kind, one of the most difficult problems entails the control of the recording device, usually a recording pen or stylus, in response to movements of the transmitter pen. For example, in a communication system in which a message, drawing, or other data is transcribed by hand upon paper or some other recording medium at the transmitter and is reproduced on a similar recording medium at the receiver, it is essential that the receiver stylus be engaged and disengaged with its associated recording medium in synchronism with the corresponding movements of the transmitter pen. Preferably, the requisite synchronous control is effected by means of an electrical signal, generated at the transmitter, which affords a positive indication as to whether or not the transmitter stylus is momentarily in contact with the recording medium at any given time.

Conventionally, communication systems of this kind generate the requisite stylus control signal by means of an electrical circuit including a pressure responsive switch mounted upon the transmitter stylus and electrically connected to the communication circuits of the transmitter. The switch is utilized to complete or to open an electrical circuit whenever the stylus is depressed with sufficient force to bring it into contact with the recording medium at the transmitter. A highly sensitive switch must be employed, particularly where the transmitter stylus is manually controlled, since the pressure exerted upon the stylus by different operators may vary to a substantial degree.

One of the principal difficulties encountered in communication systems of the above described kind relates to the electrical circuits interconnecting the transmitter pen and the remainder of the transmitter communication circuits. The mechanical problems presented in constructing a device of this kind are extremely difficult, particularly where the transmitter is also intended to operate as a receiver; that is, in systems in which the communication stations each comprise a transceiver capable of operation as either a transmitter or receiver. In addition, electrical connection of the stylus control switch to the communication circuits of the transceiver may in many instances introduce undesired stray capacities to ground which require neutralization. Consequently, it is highly desirable to eliminate completely any necessity for an electrical circuit coupling or connecting the transmitter stylus to the communication circuits of the transceiver.

It is a primary object of the invention, therefore, to afford a new and improved stylus control system for an intelligence communication system of the kind in which a recording stylus at a receiver is controlled by movement of a recording stylus at a transmitter.

Another important object of the invention is a new and improved stylus control system which requires no electrical connection between the recording pen and the communication circuits at the transmitter station of a communication system.

Another object of the invention is a new and improved stylus control apparatus for an intelligence communication system which is particularly advantageous in a communication station adapted for use as either a transmitter or a receiver.

Another object of the invention is a new and improved stylus control system in which a stylus control signal is generated by means of an electrical network which may be incorporated in the stylus itself and which requires no battery or other external or internal source of excitation.

A further object of the invention is a new and improved stylus control apparatus for a communication system which affords an accurate and substantially instantaneous indication of contact between a transmitter recording stylus and its associated recording medium.

A further object of the invention is a new and improved stylus control system which is simple and economical in construction and which affords an indefinite operating life without requiring substantial maintenance.

Other and further objects of the present invention will be apparent from the following description and claims and are illustrated in the accompanying drawings which, by way of illustration, show preferred embodiments of the present invention and the principles thereof and what is now considered to be the best mode for applying those principles. Other embodiments of the invention embodying the same or equivalent principles may be used and structural changes may be made as desired by those skilled in the art without departing from the present invention.

Figures 1, 2:
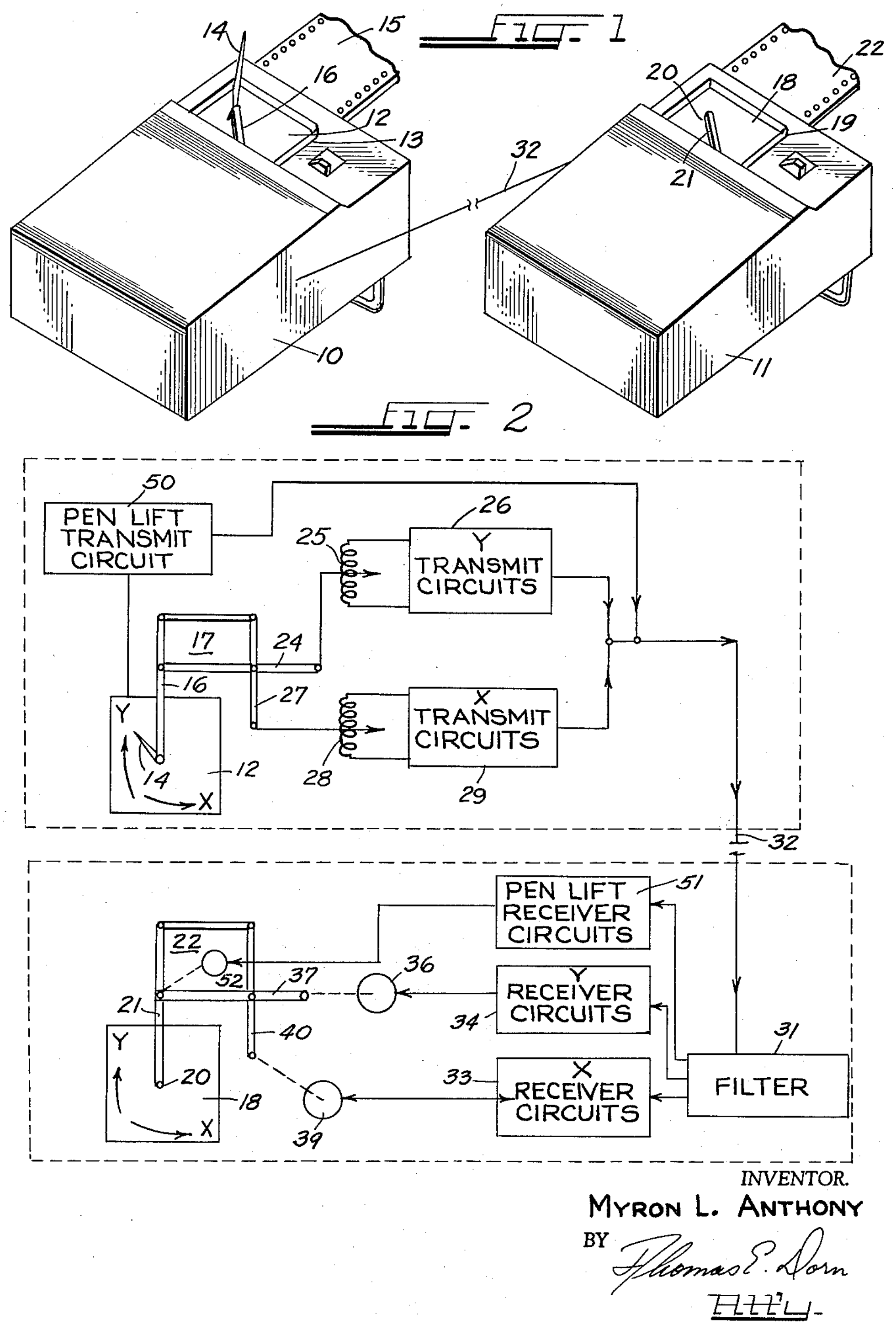
FIG. 1 is a perspective view of an intelligence communication system in which the invention may be employed.
FIG. 2 is a schematic diagram of the communication circuits and apapratus of the system of FIG. 1.

The communication system illustrated in FIGS. 1 and 2 comprises a transmitting station 10 and a receiving station 11. In a typical system, each of the units 10 and 11 is adapted to function as either a transmitter or a receiver. In order to simplify the description of the invention, however, it is assumed herein that unit 10 functions as the transmitter and that the device 11 constitutes a receiver.

The transmitter 10 includes a writing surface 12 which is enclosed by a frame 13. A pen-like recording stylus 14 is suported above the writing surface 12 and may be moved into and out of engagement with the writing surface 12. Stylus 14 is supported by a link 16 which comprises a part of a pantograph linkage 17, as best shown in FIG. 2. A sheet of paper 15 or other suitable recording medium is supported upon the writing surface 12. Thus, the pen 14 may be guided into and out of contact with the paper and may also be moved across the paper as desired to write or to form an image on the paper.

The receiver 11 is in many respects essentially similar in construction to the transmitter 10. It includes a writing surface 18 bounded by a frame 19 and having a sheet of paper 22 or other suitable recording medium support thereon. The receiver further includes a recording stylus 20 supported upon an arm or link 21 which constitutes a part of the receiver recording linkage or pantograph 22 (FIG. 2).

One arm 24 of the transmitter linkage 17 is connected to a variable impedance 25 which may comprise a variable capacitor or a variable inductor as illustrated. The inductor 25 is electrically connected to and forms a part of the Y-coordinate transmitter circuit 26. Similarly, a second arm 27 of the linkage is mechanically connected to a variable inductor 28 which comprises a part of the X-coordinate transmitter circuit 29. The output stages of the two coordinate signal circuits 26 and 29 may be coupled to each other and to a suitable filter 31 at the receiver 11 as by means of the conductor 32.

In the receiver 11, the filter 31 is electrically coupled to two receiver circuits 33 and 34, which control the X and Y coordinate movements, respectively, of the receiver stylus 20. The Y-coordinate receiver circuit 34 is electrically coupled to a motor or other suitable actuating device 36 which in turn is mechanically linked to an arm 37 of the reeciver linkage 22. Similarly, the X-coordinate receiver circuit 33 is coupled to a second motor 39 which is mechanically linked to an arm 40 of the linkage 22.

The communication system illustrated in FIGS. 1 and 2 is essentially similar in construction and operation to the system described and claimed in Patent No. 2,583,720, issued January 29, 1952, to Robert Adler and the parallel linkage systems 17 and 22 are described and claimed in Patent No. 2,583,535, to Robert Adler issued January 29, 1952, both of these patents being assigned to the same assignee as the present invention. Accordingly, only a relatively brief description of the operation of the system is necessary herein.

Movement of the transmitter stylus 14 along the Y axis indicated in FIG. 2 results in a corresponding movement of the variable element of the inductor 25. Consequently, this movement of the stylus may be utilized to vary the frequency or amplitude of a cordinate control signal of given fundamental frequency generated in circuit 26. Similarly, movement of the transmitter stylus 14 along the X axis indicated in FIG. 2 can be employed to vary the frequency or amplitude of a second coordinate control signal generated in circuit 29. The two modulated coordinate control signals are preferably of different fundamental frequency, and thus may be transmitted to the receiver along line 32 without substantial loss of intelligence. In the filter 31, the signals are segregated on the basis of frequency and are then applied to circuits 33 and 34. The output signals from the circuits 33 and 34 are applied to the control motors 39 and 36 respectively to drive the parallel linkage 22 and to move the stylus 20 across the writing surface 18 in synchronism with movement of the stylus 14 across the transmitter writing surface 12. Accordingly, the receiver stylus traces a path on the surface 18 similar to that traced by the transmitter stylus upon the surface 12.

When the recording media upon writing surfaces 12 and 18 have been filled completely with writing or other data, or when for some other reason it is desired to advance a new section or portion of the recording media onto the writing surfaces, the transmitter pen may be driven into a predetermined corner of the frame 13 or into a recess in the frame (not shown). This movement of the stylus may be utilized to generate a paper feed control signal which drives the stylus 20 into the corresponding position within the frame 19. The resulting movement of the receiver stylus 20 may be employed to control a paper feed mechanism incorporated in the receiver; a paper feed control apparatus of this kind is described and claimed in Patent No. 2,621,249 to T. I. Ress, issued December 9, 1952 and assigned to the same assignee as the present invention.

If the receiver stylus 20 were maintained continuously in contact with the recording medium on writing surface 18, it would not be possible to reproduce many forms of intelligence in legible or interpretable form at the receiver. For example, in written communications it is usually necessary that the stylus 20 be moved from its recording or contact position to an inactive or non-recording position each time a word is terminated and another word is to be started. At the same time, it is usually necessary to continue the transverse movement of the stylus with respect to the writing surface 18 in order to bring the receiver stylus into position for beginning the next word. The same requirements are present for other types of data which may be transmitted over the communication system, including drawings, sketches, and other information. Consequently, a control circuit 50 is incorporated in the transmitter 10 and is utilized to generate a control signal which is representative of movement of the stylus 14 into and out of recording position with respect to the recording medium disposed on writing surface 12. The control signal must afford an accurate and substantially instantaneous indication of marking contact between the transmitter stylus 14 and its associated recording medium.

This control circuit 50, designated as the "pen lift" transmit circuit in FIG. 2, and an associated passive circuit mounted in the pen 14, comprise the subject matter of the present invention. The control signal generated by circuit 50 is transmitted to the receiver with the signals from the circuits 26 and 29, usually by means of a modulated carrier. In the receiver 11, the demodulated carrier signal is applied to a pen lift receiver circuit 51 to develop an actuating signal, and the actuating signal is applied to a suitable motor or other apparatus 52 which is mechanically coupled to the receiver stylus 20. Thus, the motor or other signal controlled device 52 is utilized to move the receiver stylus 20 into and out of recording position with respect to the receiver recording medium in synchronism with the corresponding movements of the transmitter stylus 14.

Figures 3, 5:
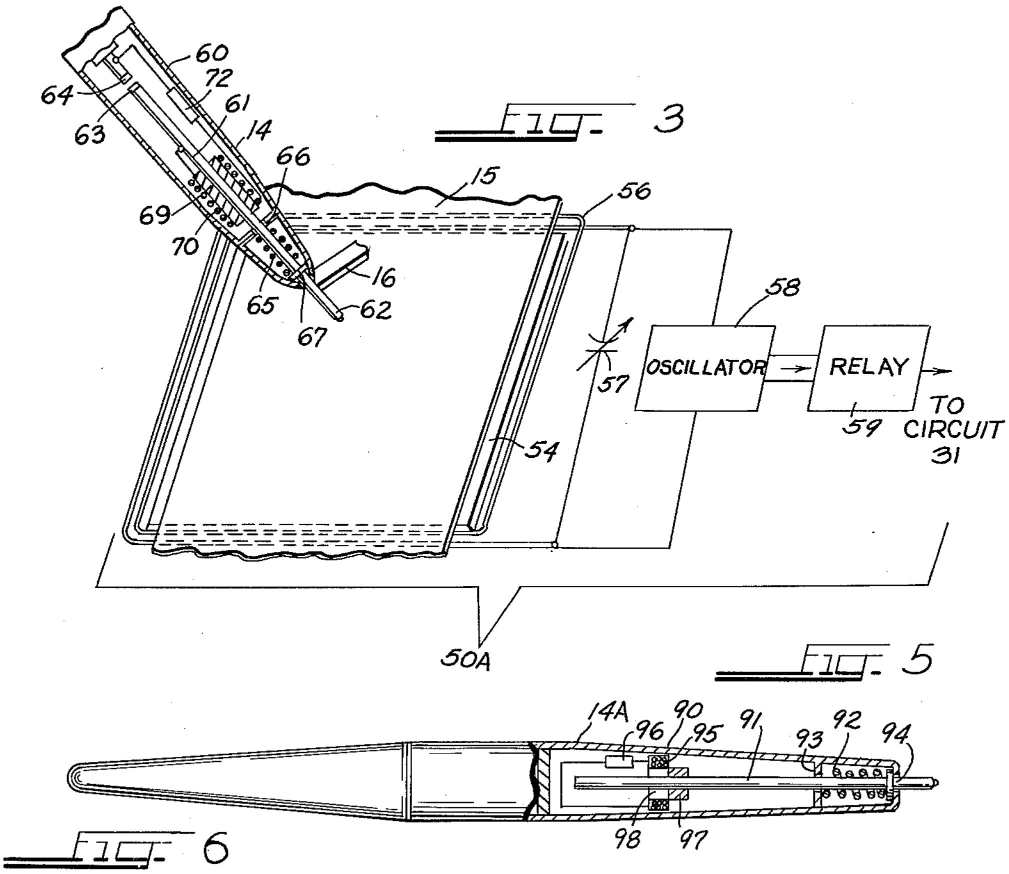
FIG. 3 illustrates one embodiment of the invention, partly in schematic block diagram form.
FIG. 5 is a sectional view of a recording pen illustrating another feature of the invention.

FIG. 3 illustrates a first embodiment of a stylus control system constructed in accordance with the invention. In this view, the stylus or pen 14 is shown in cross section, and the stylus support arm 16, together with a platen 54 which defines the writing surface of the transmitter station, is illustrated in perspective. The remainder of the stylus control system comprising the pen lift circuit 50A is shown in simplified block diagram form. As indicated in this figure, the paper or other recording medium 15 is supported upon the platen 54 in position to be engaged by the stylus or pen 14. An inductance coil 56 is disposed in encompassing relation to the platen 54. The coil 56 comprises the pickup element of the stylus control system and, in the illustrated embodiment, includes two turns disposed in encompassing relation to the platen. A capacitor 57 is connected across the coil 56; the coil 56 and the capacitor 57 together constitute the resonant circuit of an oscillator 58. The oscillator 58 is connected to the modulator circuit 30 of the transmitter (see FIG. 2) by suitable means such as a relay 59.

The stylus 14 is substantially similar in size and configuration to a conventional writing instrument such as a ball point pen or fountain pen. The stylus includes an external housing or barrel member 60 within which a writing member 61 is supported. The writing member 61 may, for example, comprise an ordinary cartridge element for a ball point pen, complete with ink supply, and terminates at one end in a writing portion or tip 62 which may engage the paper 15 to transcribe a message or other intelligence thereon. The opposite end of the writing element 61 is provided with a switch contact 63 which is normally disposed in spaced aligned relationship with respect to a stationary contact 64 supported in fixed position within the stylus barrel 60.

The writing element 61 is mounted in axially slidable relation within the pen barrel and is normally biased toward an extended position with respect to the barrel by means of a compression spring 65. One end of the bias spring 65 engages a shoulder 66 of the pen barrel 60, whereas the opposite end of the spring engages a shoulder element 67 on the writing element 61. Thus, the bias spring normally maintains the writing element in the extended position shown in the drawing but permits movement of the writing element toward the interior of the barrel 60 whenever the exposed writing tip 62 is pressed inwardly of the pen as in normal writing movements.

The pen 14 further includes a magnetic core 69 which is disposed in encompassing relation to the writing element 61, being mounted within the pen housing 60. The magnetic core 69 is preferably formed from a material having a relatively low reluctance at radio frequencies; any of the many materials conventionally employed as the cores of radio frequency inductance coils and transformers may be utilized. An inductance coil 70 is mounted upon the core 69. One end of the core 70 is electrically connected to the contact 63 on the writing element 61; the other terminal of the coil is coupled to the stationary contact 64 through a capacitor 72. Thus, the capacitor 72 and the iron core coil 70 constitute a resonant circuit, the resonant frequency of which is determined, of course, by the capacitance and inductance of the two principal circuit elements. The resonant frequency of the pen circuit should be made equal to the operating frequency of the oscillator 58. This resonant circuit, however, is normally open, since the two switch contacts 63 and 64 are not normally in contact with each other when the pen is not in operation.

Operation of the pen lift control system illustrated in FIG. 3 is extremely simple and is controlled entirely by the normal writing movements of the pen 14. When the transmitter circuit (see FIG. 2) is placed in operation, the oscillator 56 is energized, developing an oscillatory signal of given amplitude which is applied to the relay 59 of the oscillator modulator 30. The passive network comprising the coil 70 and the capacitor 72 in the recording pen 14 does not affect the frequency or amplitude of the oscillator signal, since the passive circuit is open. Consequently, even though the pen 14 is disposed in close proximity to the pickup coil 56, the oscillator remains in operation regardless of the transverse position of the pen with respect to the writing surface defined by the platen 54.

As soon as the pen is depressed into marking engagement with the recording medium 15 supported upon the platen, however, the circuit conditions are changed very substantially. The relatively small biasing force applied to the writing element 61 by the spring 65 is overcome by even the minor pressure exerted upon the pen in a normal writing or drawing operation. Consequently, the writing element 61 moves inwardly of the barrel 60, closing the two switch contacts 63 and 64. This completes the resonant circuit comprising the capacitor 72 and the coil 70. Because this resonant circuit is disposed in close proximity to and within the field of the principal inductance 56 of the oscillator 58, it exerts a substantial damping effect upon the oscillator. As a consequence, the amplitude of the oscillatory signal is substantially reduced. In fact, the system may easily be constructed to interrupt oscillation of the device 56 completely as soon as the switch contacts 63 and 64 close, and this construction is preferably utilized. As a consequence, the output signal from the oscillator 58 to the relay 59 is interrupted, and may effect a marked change in the operating conditions in the oscillator modulator circuit 30 (see FIG. 2).

It is thus seen that the stylus control system illustrated in FIG. 3 affords a virtually instantaneous and accurate indication of engagement of the writing tip 62 of the pen 14 with the recording medium 15. The control signal generated by the oscillator 58 is applied to the modulator circuit of the transmitter station and is effectively transmitted to the receiver station and utilized at the receiver to control movement of the receiver stylus 20 between its recording and inactive positions. Stated differently, the control system affords a two-valued control signal providing a positive indication as to whether or not the transmitter stylus is instantaneously being utilized to record information on the recording medium 15. This on-off signal may be readily utilized to actuate corresponding movements of a receiver stylus, maintaining the two in synchronism with respect to even relatively small vertical movements of the transmitter recording stylus.

Figure 4:
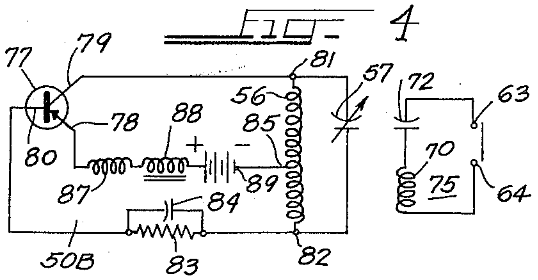
FIG. 4 is a detailed schematic diagram of the electrical circuit of one embodiment of the invention.

FIG. 4 is a schematic diagram of another embodiment of the invention which is essentially similar to that of FIG. 3 but utilizes a somewhat modified circuit arrangement. The embodiment of FIG. 4 comprises a pen lift circuit 50B which is adapted for cooperative operation in conjunction with a pen circuit 75. The pen circuit 75 may be the same as described hereinabove in connection with the stylus 14 and may comprise the inductance coil 70 and the capacitor 72 connected together to form a resonant circuit through a switch including the contacts 63 and 64. The pen lift circuit 50B also includes a parallel-resonant frequency-determining circuit which may comprise the inductance coil 56 disposed in encompassing relation to the transmitter platen (see FIG. 3) and the capacitor 57.

In this instance, the pen lift circuit also includes a junction transistor 77 having an emitter electrode 78, a collector electrode 79, and a base electrode 80. The collector electrode 79 is connected to one terminal 81 of the resonant circuit 56, 57. The base electrode 80 is connected to the second terminal 82 of the resonant circuit through a self-bias circuit comprising a resistor 83 connected in parallel with a capacitor 84. The emitter electrode 78, on the other hand, is connected to a tap 85 on the inductance coil 56 by means of a circuit comprising, in series, a radio frequency choke 87, a relay operating coil 88, and a source of unidirectional operating potential herein illustrated as a battery 89. In the illustrated embodiment, the device 77 is a PNP junction transistor, and the operating polarities are as indicated in connection with the battery 89; it will be understood, of course, that the polarity of the source 89 should be reversed if an NPN transistor is utilized in the circuit.

The operation of the circuit of FIG. 4 is relatively simple. Disregarding for the moment the possible effect of the pen circuit 75, it is seen that the pen lift transmitter circuit 50B constitutes an oscillator having a frequency determined primarily by the resonant circuit 56, 57. The emitter current flowing in the circuit is of relatively low amplitude; consequently, it may be assumed that the relay (not shown) with which the coil 88 is associated is normally maintained in an unactuated condition. The self-bias potential developed in the biasing circuit 83, 84, which comprises the oscillatory signal rectified by the diode action of the transistor, is in series opposition to the normal forward bias afforded by the D.C. source 89. Consequently, the D.C. current in the emitter-collector circuit varies inversely as the amplitude of the oscillatory signal.

When the switch comprising the contacts 63 and 64 is closed, however, as described above, the resonant pen circuit 75 comprising the coil 70 and the capacitor 72 effectively damps the oscillator and, preferably, stops oscillation completely. As a consequence, the reverse bias on the transistor afforded by the circuit 83, 84 is substantially reduced in amplitude, and the D.C. current in the emitter-collector circuit is markedly increased. Under these circumstances, a much larger current flows through the relay coil 88, permitting actuation to a second operating condition. Accordingly, the pen lift transmitter circuit 50B effectively applies to the relay coil a two-valued control signal substantially similar to that supplied to the relay 59 in the embodiment of FIG. 3, although in this instance the oscillatory signal itself does not constitute the control signal; rather, the control signal comprises a variable D.C. signal which varies inversely in accordance with changes in the oscillator signal amplitude.

In order to afford a more complete and specific example of one embodiment of the invention, certain of the circuit parameters for the control system of FIG. 4 are set forth in detail hereinafter. It should be understood that this material is included solely by way of illustration and in no sense as a limitation on the invention.

| | |
|---|---|
| Transistor 77 | 2 N 114. |
| Capacitor 57 | 50 micromicrofarads. |
| Capacitor 72 | 5 micromicrofarads. |
| Capacitor 84 | 0.01 microfarad. |
| Resistor 83 | 330 Kolohms. |
| D.C. source 89 | 12 volts. |
| Operating frequency | 20 megacycles. |
| Collector current (oscillating) | 0.75 milliamperes. |
| Collector current (non-oscillating) | 3.2 milliamperes. |

FIG. 5 illustrates another pen construction including a somewhat different circuit which may be utilized in conjunction with either of the pen lift transmitter circuits 50A and 50B of FIGS. 3 and 4. The stylus or pen 14A illustrated in this figure comprises a barrel or housing 90 within which a writing element 91 is mounted. The writing element 91 may comprise a conventional cartridge type ball point writing element or other similar device. The writing element is slidably disposed within one end of the pen barrel 90 and extends outwardly thereof. A biasing spring 92 is mounted upon the writing element 91; one end of the spring engages a shoulder 93 extending internally of the barrel 90 whereas the other end of the spring 92 engages a shoulder element 94 mounted in fixed axial position on the writing element 91.

An inductance coil 95 is mounted within the pen barrel 90 in fixed position therein. The opposite ends of the coil are connected to a capacitor 96 to constitute a resonant circuit. In addition, a core 97 is affixed to the writing element 91 in alignment with the central opening 98 in the coil 95, but is normally displaced from the opening 98. The core 97 may be formed from ferrite or other high permeability magnetic material suitable for use at radio frequencies.

The pen 14A is utilized in a communication system in the same manner as the pen 14 as described hereinabove. That is, the pen is connected to a link of the pantograph mechanism at the communication system transmitter, such as the link 16 of the pantograph 17 (see FIG. 2), and is guided across a recording medium and into and out of contact therewith to write a message or transcribe other data on the recording medium. When the pen is in marking contact with the recording medium, the writing element 91 is driven inwardly of the pen barrel 90 against the relatively small biasing force afforded by the spring 92. As a consequence, the core 97 is pushed into the coil 95 whenever the pen is actually in marking engagement with the paper or other recording medium. Whenever the pen is released from contact with the paper, however, the biasing spring 92 returns the writing element to the position illustrated in FIG. 5, thereby substantially removing the core 97 from the coil 95. It is thus seen that the inductance of the coil 95 changes materially each time the pen 14A is moved into marking contact with a recording medium or is removed to a non-recording position.

Figure 6:
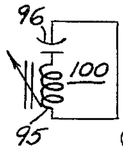
FIG. 6 is a schematic diagram of the electrical circuit for the pen of FIG. 5.

The electrical circuit of the pen 14A may therefore be represented by the circuit diagram of FIG. 6, showing capacitor 96 connected to the coil 95 in a resonant circuit 100. The circuit 100 is constructed to have a resonant frequency approximately equal to the operating frequencies of the pen lift transmit circuit (see FIGS. 3 and 4) whenever the writing element 91 is moved inwardly of the pen barrel 90 to dispose the core 97 within the aperture 98 of the coil 95. Because the effective inductance of the coil changes markedly when the pen is released from recording contact, however, the resonant circuit 100 of FIG. 6 is very substantially detuned with respect to the oscillator frequency when the pen is not in use. Consequently, the pen circuit 100 has no appreciable effect upon the pen lift oscillator circuit when the pen is not in actual recording contact with the paper or other recording medium, despite the fact that the pen might be located in close proximity to the recording medium.

Figure 7:
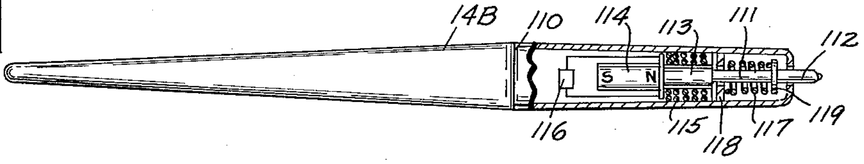
FIG. 7 illustrates another recording pen constructed in accordance with the invention.

FIG. 7 illustrates another recording stylus or pen 14B which may be utilized in a control system constructed in accordance with the invention. The pen 14B includes a barrel or housing 110 within which a marking element 111 is mounted, the tip or end portion 112 of the marking element extending from the barrel 110. The marking element 111 is somewhat different than those described in connection with the recording pens 14 and 14A of FIGS. 3 and 5 and is intended for use in conjunction with a pressure-sensitive recording medium. Thus, the marking element 111 does not include an ink supply or the like. The pressure marking element includes three separate sections; these are the marking tip 112, a core section 113, and a permanent magnet section 114. The tip and core sections 112 and 113 may be formed from any material exhibiting a relatively low reluctance at radio frequencies and further exhibiting substantial changes in reluctance with changes in flux density. Ferrite materials are suitable for this purpose, since in many of the ferrites commonly employed as cores for radio frequency coils and transformer the permeability is highly dependent upon flux density.

An inductance coil 115 is mounted upon the writing element 111 and is electrically connected to a capacitor 116. The coil 115 and the capacitor 116 therefore constitute a resonant circuit, the resonant frequency of which is determined at least in part by the magnetic properties of the core 113. The writing element may be biased toward an extended position by means of a spring 117 which engages shoulders 118 and 119 on the barrel 110 and the writing element 111 respectively. If desired, however, in this embodiment the biasing arrangement may be omitted entirely and the marking element may be mounted in fixed position with respect to the barrel 110.

The electrical circuit within the stylus 14B is normally detuned with respect to the operating frequency of the oscillator (see FIGS. 3 and 4) with which it cooperates. Consequently, it may be disposed in close proximity to the coil 56 of the oscillator without substantially affecting the oscillator operation. If the stylus is brought into close contact with a magnetic material of relatively high permeability, however, the flux density within the core 113 and the marking portion 112 of the marking element 111 increases substantially. In this manner, the coil 115 may be tuned to bring the resonant circuit to the oscillator frequency whenever the pen is engaged in pressure contact with the recording medium. Thus, the pen of FIG. 7 may cooperate with a pen lift transmit circuit constructed in accordance with either of the embodiments of FIGS. 3 and 4 to afford the requisite two-valued control signal indicative of movement of the pen to its recording or non-recording positions. Of course, it is necessary that the platen (see element 54 of FIG. 3) be fabricated from a low reluctance magnetic material to achieve this effect.

In each of the several embodiments of the invention described hereinabove, the requisite control signal is developed by means of a passive electrical network located within the recording stylus or pen. No electrical connections are made between the recording pen and the other communication circuits of the transmitter station, thereby eliminating entirely the difficult mechanical and electrical problems inherent in previously known devices of this kind. Because no electrical connections are required between the pen and the other parts of the transmitter, it is a relatively simple matter to afford a convenient mechanical mounting arrangement to receive either a transmitter pen such as the above described pens 14, 14A and 14B, or a simple receiver marking stylus. No batteries or other external or internal sources of excitation are required for the pen circuits. This is highly important, since the pens may be handled roughly, and may be used indefinitely without requiring substantial maintenance.

While preferred embodiments of the invention have been described and illustrated, it is to be understood that these are capable of variation and modification. Accordingly, the airm in the appended claims is to cover all such variations and modifications as may fall within the true spirit and scope of the invention.

I claim:

1. A stylus control system for use in an intelligence communication system of the kind comprising a transmitter and a receiver each including a stylus movable between a recording position and a non-recording position with respect to a record medium, said receiver further including signal-controlled means for moving the receiver stylus between its recording and non-recording positions, said stylus control system comprising: a signal generator for generating a stylus control signal and including an impedance element disposed adjacent a predetermined portion of the recording medium at said transmitter; and a transmitter stylus including an independent passive electrical circuit, having no electrical connection to said signal generator, mounted thereon and further including means for actuating said circuit between first and second operating conditions, in which said passive circuit induces markedly different reflected impedance in said impedance element to produce correspondingly different effects upon said control signal, in response to movement of said transmitter stylus between its recording and non-recording positions.

2. A stylus control system for use in an intelligence communication system of the kind comprising a transmitter and a receiver each including a stylus movable between a recording position and a non-recording position with respect to a record medium, said receiver further including signal-controlled means for moving the receiver stylus between its recording and non-recording positions, said stylus control system comprising: a signal generator for generating a stylus control signal of given frequency, including an inductance coil disposed adjacent a predetermined portion of the recording medium at said transmitter; and a transmitter stylus including an independent passive electrical circuit, having no electrical connection to said signal generator, mounted thereon in mutual coupling position with respect to said inductance coil and further including means for actuating said circuit between first and second operating conditions, in which said passive circuit has markedly different effects upon said control signal, in response to movement of said transmitter stylus between its recording and non-recording positions.

3. A stylus control system for use in an intelligence communication system of the kind comprising a transmitter and a receiver each including a stylus movable between a recording position and a non-recording position with respect to a record medium, said receiver further including signal controlled means for moving the receiver stylus between its recording and non-recording positions, said stylus control system comprising: a signal generator for generating a stylus control signal of predetermined frequency and including an oscillator having an impedance disposed adjacent a predetermined portion of the recording medium at said transmitter; and a transmitter stylus including an independent passive electrical circuit, having no electrical connection to said signal generator, mounted thereon and further including means for actuating said circuit between first and second operating conditions, in only one of which said passive circuit is resonant at said predetermined frequency, in response to movement of said transmitter stylus between its recording and non-recording positions.

4. A stylus control system for use in an intelligence communication system of the kind comprising a transmitter and a receiver each including a platen and a stylus movable between a recording position and a non-recording position with respect to a record medium supported on said platen, said receiver further including signal controlled means for moving the receiver stylus between its recording and non-recording positions, and stylus control system comprising: a signal generator for generating a stylus control signal and including an inductance coil disposed in encompassing relation to the platen at said transmitter; and a transmitter stylus including an independent passive electrical circuit, having no electrical connection to said signal generator, mounted thereon and further including means for actuating said circuit between first and second operating conditions, in which said passive circuit has markedly different effects upon the amplitude of said control signal, in response to movement of said transmitter stylus between its recording and non-recording positions.

5. A stylus control system for use in an intelligence communication system of the kind comprising a transmitter and a receiver each including a stylus movable between a recording position and a non-recording position with respect to a record medium, said receiver further including signal controlled means for moving the receiver stylus between its recording and non-recording positions, said stylus control system comprising: a signal generator for generating a stylus control signal and including an oscillator having an inductance disposed adjacent a predetermined portion of the recording medium at said transmitter; and a transmitter stylus including an independent passive electrical circuit, having no electrical connection to said signal generator, mounted thereon and further including means for actuating said circuit, in response to movement of said transmitter stylus between its recording and non-recording positions, between a first operating condition in which said passive circuit has no appreciable effect upon said oscillator and a second operating condition in which said passive circuit effectively absorbs energy from the electromagnetic field of said inductance and modifies operation of said oscillator.

6. A stylus control system for use in an intelligence communication system of the kind comprising a transmitter and a receiver each including a stylus movable between a recording position and a non-recording position with respect to a record medium, said receiver further including signal controlled means for moving the receiver stylus between its recording and non-recording positions, said stylus control system comprising: a signal generator for generating a stylus control signal of given frequency, including an inductance coil disposed adjacent a predetermined portion of the recording medium at said transmitter; and a transmitter stylus including a housing, an independent passive electrical circuit, having no electrical connection to said signal generator, tunable to said control signal frequency and comprising an inductance and a capacitance disposed within said housing, a writing element mounted within said housing and extending partially therefrom, and means for effectively tuning and detuning said passive circuit in response to recording engagement and disengagement of said writing element with said recording medium to induce substantially different reflected impedances in said signal generator inductance coil and thereby modulate said control signal in direct accordance with engagement and disengagement of said writing element.

7. A stylus control system for use in an intelligence communication system of the kind comprising a transmitter and a receiver each including a stylus movable between a recording position and a non-recording position with respect to a record medium, said receiver further including signal controlled means for moving the receiver stylus between its recording and non-recording positions, said stylus control system comprising: a signal generator for generating a stylus control signal of given frequency, including an inductance coil disposed adjacent a predetermined portion of the recording medium at said transmitter; and a transmitter stylus including a housing, an independent passive electrical circuit, having no electrical connection to said signal generator, resonant at said control signal frequency and comprising an inductance and a capacitance disposed within said housing, a writing element mounted within said housing and extending partially therefrom, and switch means for effectively closing and opening said passive circuit in response to recording engagement and disengagement of said writing element with said recording medium to induce substantially different reflected impedances in said signal generator inductance coil and thereby modulate said control signal in direct accordance with engagement and disengagement of said writing element.

8. A stylus control system for use in an intelligence communication system of the kind comprising a transmitter and a receiver each including a stylus movable between a recording position and a non-recording position with respect to a record medium, said receiver further including signal controlled means for moving the receiver stylus between its recording and non-recording positions, said stylus control system comprising: a signal generator for generating a stylus control signal of given frequency, including an inductance coil disposed adjacent a predetermined portion of the recording medium at said transmitter; and a transmitter stylus including a housing, an independent passive electrical circuit, having no electrical connection to said signal generator, tunable to said control signal frequency and comprising an inductance and a capacitance disposed within said housing, a writing element slidably mounted within said housing and extending partially therefrom, biasing means urging said writing element outwardly of said housing, and means for effectively tuning and detuning said passive circuit in response to movement of said writing element with respect to said housing caused by recording engagement and disengagement of said writing element with said recording medium to induce substantially different reflected impedances in said signal generator inductance coil and thereby modulate said control signal in direct accordance with engagement and disengagement of said writing element.

9. A stylus control system for use in an intelligence communication system of the kind comprising a transmitter and a receiver each including a stylus movable between a recording position and a non-recording position with respect to a record medium, said receiver further including signal controlled means for moving the receiver stylus between its recording and non-recording positions, said stylus control system comprising: a signal generator for generating a stylus control signal of given frequency, including an inductance coil disposed adjacent a predetermined portion of the recording medium at said transmitter; and a transmitter stylus including a housing, an independent passive electrical circuit, having no electrical connection to said signal generator, tunable to said control signal frequency and comprising an inductance and a capacitance disposed within said housing, a writing element slidably mounted within said housing and extending partially therefrom, and means for effectively tuning and detuning said passive circuit in response to recording engagement and disengagement of said writing element with said recording medium to induce substantially different reflected impedances in said signal generator inductance coil and thereby modulate said control signal in direct accordance with engagement and disengagement of said writing element, said means comprising a magnetic core disposed upon said writing element for sliding movement therewith between first and second positions relative to said inductance.

10. A stylus control system for use in an intelligence communication system of the kind comprising a transmitter and a receiver each including a stylus movable between a recording position and a non-recording position with respect to a record medium, said receiver further including a signal controlled means for moving the receiver stylus between its recording and non-recording positions, said stylus control system comprising: a transmitter platen of high permeability magnetic material for supporting said recording medium; a signal generator for generating a stylus control signal of given frequency, including an inductance coil disposed in encompassing relation to said transmitter platen; a transmitter stylus including a housing, an independent passive electrical circuit, having no electrical connection to said signal generator, tunable to said control signal frequency and comprising an inductance and a capacitance disposed within said housing, a writing element of magnetic material having a permeability dependent upon flux density mounted within said housing and extending partially therefrom, and means for effectively tuning and detuning said passive circuit in response to recording engagement and disengagement of said writing element with said recording medium to induce substantially different reflected impedances in said signal generator inductance coil and thereby modulate said control signal in direct accordance with engagement and disengagement of said writing element, said means comprising a permanent magnet disposed in engagement with said writing element.

References Cited in the file of this patent

UNITED STATES PATENTS

| | | |
|---|---|---|
| 402,415 | Dewey | Apr. 30, 1889 |
| 2,295,442 | Wilhelm | Sept. 8, 1942 |
| 2,590,294 | Both | Mar. 25, 1952 |
| 2,621,249 | Ress | Dec. 9, 1952 |
| 2,692,301 | Ress | Oct. 19, 1954 |
| 2,907,824 | Peek | Oct. 6, 1959 |